UNITED STATES PATENT OFFICE.

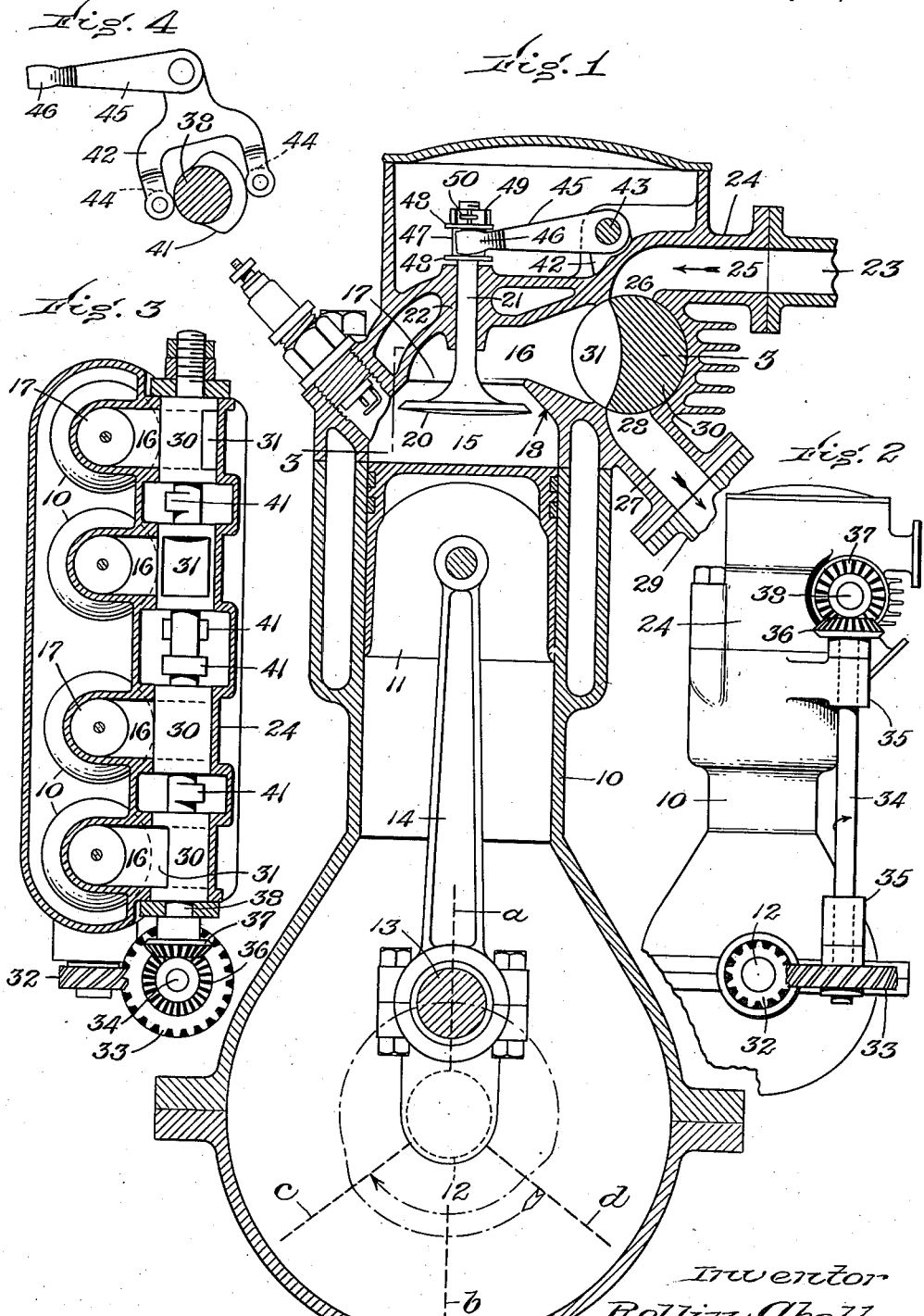

ROLLIN ABELL, OF MILTON, MASSACHUSETTS.

INTERNAL-COMBUSTION ENGINE.

1,311,200.  Specification of Letters Patent.  Patented July 29, 1919.

Application filed May 26, 1915. Serial No. 30,549.

*To all whom it may concern:*

Be it known that I, ROLLIN ABELL, a citizen of the United States, and resident of Milton, in the county of Norfolk and State of Massachusetts, have invented certain new and useful Improvements in Internal-Combustion Engines, of which the following is a specification.

Up to the present time it has been considered desirable and necessary to provide an intake valve and an exhaust valve for each cylinder of an engine of the four-stroke-cycle type. In such engines there are serious difficulties which, I have found, owe their origin to such construction, and my present invention involves a departure from the construction mentioned, whereby an engine may be rendered capable of greater speed, whereby the loss of pressure from the combustion chamber is minimized, and whereby the flushing of the walls of the combustion chamber is promoted.

One characteristic feature of an engine constructed in accordance with my present invention is that there is only one pressure-sustaining valve for each combustion chamber, whereas in the majority of engines as hitherto constructed there are two pressure-sustaining valves, one for intake and the other for exhaust, for each combustion chamber. The single pressure-sustaining valve as used according to my present invention may be arranged concentrically with relation to the cylinder axis, and the port which it controls may be relatively large to enable the gases to flow at relatively low velocity and in large volume. It is thus assured that the combustion chamber shall have the necessary volume of fresh gas to enable the engine to operate at high speed.

High engine speed also requires rapid closing of the pressure-sustaining valve. In the majority of internal combustion engines now in use the pressure-sustaining valves are closed by springs, and the closing springs are not sufficiently rapid in their operation to keep pace with the speed of which my present improved engine is capable, and I have therefore provided mechanism which acts positively to close the pressure-sustaining valve or valves (there would be one pressure-sustaining valve for each cylinder) at a speed commensurate with the engine speed, thus overcoming the ineria of the valve or valves positively and quickly instead of depending upon a relatively slow acting spring or springs for that purpose.

The fresh charges enter the combustion chamber and the burnt or burning discharges pass from the combustion chamber through the same port, and the pressure-sustaining valve which controls said port is therefore enveloped alternately in the relatively cool fresh charges and the relatively hot discharges. The significance of this fact is that the pressure-sustaining valve does not become heated to a temperature which will cause it to pit or to warp, and it will therefore retain its original pressure-sustaining efficiency.

The concentric arrangement of which the combustion-chamber port is capable enables me to taper the wall of each combustion chamber from the cylindric portion to the port. In a combustion chamber so formed each fresh charge upon reaching the valve is transformed into a conical sheet, and flushes the entire surface of the cylinder from the port to the piston, thus eliminating the deposit of carbon which has hitherto been found on the cylinder surface of all combustion chambers which have two pressure-sustaining valves.

In addition to the pressure-sustaining valve my present invention includes other valve mechanism by which the fresh charges and burnt discharges are controlled outside the combustion chamber. Each cylinder has in its head end a relatively short passageway through which the fresh charges and discharges are conducted. This passageway has communication with the combustion chamber through the port hereinbefore mentioned. It also has an intake port and an exhaust port which are controlled by the valve mechanism above mentioned. This valve mechanism is capable of much variation both in the matter of structure and in the matter of arrangement. I have shown a single valve which coöperates with the intake port and with the exhaust port of said passageway, said valve being subjected alternately to the cooling action of the fresh charges and to the heating action of the discharges, being in this respect on the same footing as the pressure-sustaining valve. It will be obvious, however, that the fundamental principle of this invention is not limited to any one form or any one arrangement of the valve mechanism by which the fresh charges and discharges are controlled outside the combustion chamber.

Other improvements are illustrated upon the accompanying drawings and are hereinafter described and claimed.

On the drawings:

Figure 1 represents a vertical section through the center of a cylinder of an internal combustion engine embodying the present invention. In the position shown, the burnt gases have just been discharged and a fresh charge is about to enter the combustion chamber.

Fig. 2 represents an end elevation of the engine.

Fig. 3 represents a horizontal section through the structure intersected by line 3—3 of Fig. 1, the engine being here represented as having four cylinders.

Fig. 4 represents an elevation of the operating mechanism for one of the pressure-sustaining valves.

The same reference characters indicate the same parts wherever they occur.

Although I have illustrated an engine having four cylinders, it is to be understood that the invention may be embodied in an engine having but one cylinder or in an engine having any number of cylinders. As the several cylinders and their respective accessories are similar, the reference characters used for one of them will be duplicated for the others.

A cylinder is indicated at 10, and a piston coacting therewith is indicated at 11. These elements, together with the crankshaft 12, crank 13, and connecting rod 14, may be of any well known or desired construction. The engine shown is of the water-cooled type, but the character of the cooling system is of no special consequence so far as this invention is concerned.

The combustion chamber is indicated at 15. The fresh charges are conducted to the combustion chamber, and the burnt or burning discharges are conducted from said chamber, through a passageway 16, the port connecting said chamber and passageway being indicated at 17. This port is preferably concentric with relation to the axis of the cylinder, and is so shown, for reasons which will be explained. The internal surface of the cylinder tapers continuously, as indicated at 18, from the cylindric portion to the port 17, this tapering formation being concerned, conjointly with the concentric arrangement of the port 17, with the purpose of keeping the wall of the cylinder flushed by the incoming fresh charges.

A pressure-sustaining valve of the puppet type is indicated at 20, said valve being arranged to be seated against a portion of the tapering surface 18, to control the port 17. This valve has a stem 21 which is arranged to slide in a bearing 22.

An intake pipe for conducting the fresh charges to the engine is indicated at 23. As I have shown an engine having more than one cylinder, the pipe 23 may be regarded as a branch of an intake manifold of any well-known or desired construction. The branch 23 is coupled to the cylinder head 24 which has an intake passageway 25. The fresh charges pass from passageway 25 through port 26 into the passageway 16, being controlled, as hereinafter explained, by suitable valve mechanism. After each fresh charge has passed through the passageway 16 into the combustion chamber, the pressure-sustaining valve 20 is closed and remains closed until such charge has been compressed and ignited, after which the valve 20 is opened to release the burnt or burning gases from the combustion chamber. Said gases then flow back into the passageway 16, from which they are conducted to an exhaust passageway 27. The latter passageway has a port 28 which is controlled by suitable valve mechanism. An exhaust pipe is indicated at 29. Inasmuch as the passageway 16 is employed alternately to conduct the fresh charges to the combustion chamber and to conduct the burnt or burning gases from the combustion chamber, I apply the phrase "intake-and-exhaust passageway" to it for the sake of identification.

Various forms of valve mechanism may be employed to control the admission of fresh charges to the passageway 16 and to control the release of the burnt gases therefrom, and such valve mechanism is capable of various arrangements. Separate valves may be employed to perform these two functions, and, on the other hand, a single valve may be employed to perform them. I have shown a single valve 30 capable of performing both the said functions, but it is not to be understood that the invention as hereinafter claimed is to be regarded as limited to any specific form or arrangement of valve mechanism, excepting where it is specified. The valve 30 is cylindric, and in the present instance it is driven continuously in one direction at one-half the speed of the crankshaft 12, the engine being of the four-stroke-cycle type. The crankshaft 12 and valve 30, as shown by Fig. 1, both rotate in the direction of the hands of a clock. The valve is formed with a cavity 31 through which the gases pass from port 26 to passageway 16, and then from passageway 16 to port 28. According to the positions of the several parts, this unit of the engine is at the beginning of a cycle of operations. The piston has just completed its expelling stroke and is about to begin its intake stroke. The pressure-sustaining valve is open to admit a fresh charge to the combustion chamber.

The rotary valve 30 has just cut off the exhaust port 28 from the passageway 16 and is about to uncover the intake port 26.

Various angular positions of the crankshaft are indicated by radial lines in Fig. 1. Radial line *a* indicates the angular position of the crank at the beginning of a cycle of operations, and also indicates the position at which the working stroke of the piston begins when the cycle is half completed. Assuming that the crankshaft is rotating, the cavity 31 will be brought immediately into register with the intake port 26, and the piston will begin to descend to draw in a fresh charge. The intake stroke ends when the crank is at the angular position indicated by line *b*, but the valves remain open until the crank reaches an angular position at or near line *c*. Then the pressure-sustaining valve closes and the feed valve cuts off the intake port 26. The piston, now rising, compresses the fresh charge and the latter is ignited in due course, the pressure-sustaining valve remaining closed until the crank, on its next down stroke, is at or near the angular position indicated by line *d*. In the meantime the burning gases have done their work. The pressure-sustaining valve opens when the crank is at or near position *d*, and at the same time the cavity 31 moves into register with exhaust port 28. The burnt or burning gases, being thus released by both valves, are discharged into the exhaust passageway 27, the exhaust period being coextensive with the travel of the crank from line *d* to line *a*. Thus the cycle is completed, the pressure-sustaining valve remaining open continuously throughout the exhaust period of one cycle and throughout the intake period of the consecutive cycle. The same cycle of operations occurs in each of the cylinders, but the latter work in succession according to any desired or well-known sequence.

From the foregoing description it will be seen that the valve 20 is enveloped alternately by the comparatively cool incoming charges and by the outgoing burnt or burning discharges. It may also be remarked that the cavity 31 in the valve 30 is traversed alternately by the relatively cool incoming charges and the relatively hot outgoing discharges. I thus utilize the fresh charges to keep the two valves from being excessively heated. This is especially important in the case of the valve 20, because the latter is relied upon to sustain the pressure in the combustion chamber.

In consequence of having only one port in each combustion chamber I am enabled to arrange such port concentrically and to give it as large diameter as may be necessary to conduct the gases in large volumes at high engine speed. Furthermore, the absence of recesses in the combustion chamber enables the gases to pass into and out of the combustion chamber without excessive obstruction. These two conditions enable the engine to operate at very high speed, provided the valve 20 is closed at a correspondingly high speed. Mechanism hereinafter described is provided for assuring the desired speed of closing movement of the valve 20.

Another advantage of the concentric arrangement of the valve 20 is that it causes the incoming fresh charges to flush the wall of the combustion chamber equally on all sides. The tapering formation of the surface 18 eliminates pockets or recesses in which the gases might otherwise remain. The incoming gases upon reaching the valve 20 take the form of a conical sheet and traverse the surface of the cylinder from the port to the piston with a flushing effect. The flushing action is uniform at all points, and the deposit of carbon upon the cylinder is minimized if not entirely eliminated. I have described the surface 18 as being tapering, and have shown it as frusto-conical; but the term "tapering" as applied to this surface is to be construed in a broad sense as contemplating a partially spherical or dome shape.

The passageway 16 is flushed by the fresh charges as often as it is traversed by the burnt discharges, and it has no pockets or recesses in which the gases may remain. For these reasons the deposit of carbon upon the passageway 16 is eliminated, or at least minimized.

Fig. 2 shows mechanism for transmitting rotation from the crankshaft to drive the several feed valves 30 and cams which operate the pressure-sustaining valves. A spiral gear 32 carried by the crankshaft drives a spiral gear 33 which is affixed to an upright shaft 34. The speed ratio of the gears 32 and 33 is as two to one, causing the shaft 34 to rotate at one-half the speed of the crankshaft. The shaft 34 is mounted in bearings 35, 35. At its upper end it is provided with a miter gear 36 which drives a miter gear 37. Gear 37 is affixed to a shaft 38 upon which the several valves 30 are arranged. As shown the valves and shaft are all made of a single piece. This shaft is also provided with cams 41 which operate the several pressure-sustaining valves 20. The several valves 30 and the several cams 41 are timed to cause the cylinders to operate in succession according to the desired sequence.

It has been the practice, hitherto, to provide single-acting cams for opening the puppet valves of engine cylinders, and to employ springs for closing such valves, excepting in engines which depend upon the suction of the pistons to open the intake valves. The demand for high engine speed has caused suction-operated valves to be almost wholly superseded by the so-called "mechanically operated" valves, that is, valves opened positively by means such as cams. This has helped to increase the engine speed, but there is a critical speed beyond which even this will not help, although the foremost designers of such engines have been experimenting for years in trying to exceed this critical speed. One of the leading manufacturers to-day claims a maximum speed of 3,400 revolutions per minute, and gives the maximum speed of its nearest competitors as follows: one attains 3,000 revolutions, two attain 2,600, several attain 2,200, and others attain only 1,800 or 1,400 revolutions respectively. They are all using cams for opening their valves and springs for closing them. They try stiffer springs, hoping to make the closing movement more rapid, but when the springs are so stiff as to exceed the critical speed they break the heads from the stems of the valves or otherwise break the valves. The greater the speed becomes, the greater is the opening momentum acquired by the valve mechanism, and no valve can withstand, under fire, the violent closing impacts due to excessive spring stress, when the opening cam is ahead of its roller. Tardy closing of the intake valve permits some of the fresh charge to leak back when it ought to be imprisoned in the cylinder and undergoing compression.

All the card indications of power curves show an abrupt and accelerative decrease of power as the engine speed progresses beyond the critical point.

I have provided a form of valve-operating mechanism which acts positively to close, as well as to open, the pressure sustaining valve 20, and which increases the maximum valve speed without causing violent impacts. With this form of valve-operating mechanism, an engine has attained 6,000 revolutions per minute, and this was done by the first structure of this kind ever built.

Fig. 4 shows mechanism for operating one of the valves 20, such mechanism being duplicated for each of the pressure-sustaining valves of the other cylinders. A bell-crank lever having a forked arm 42 is mounted upon a rod 43 and is provided with two coöperative cam-engaging shoes 44 shown in the form of anti-friction rolls. The lever 42 is oscillated positively in both directions by the cam. The other arm 45 of the bell-crank is forked at its outer end 46 and arranged to straddle a nut 47. This nut is threaded upon the valve stem 21 to afford adjustability of the valve relatively to its operating mechanism. Flanges 48 formed upon the nut bear against the top and bottom sides of the forked portion 46, the latter being rounded to permit freedom of coöperation with the flanges, notwithstanding the angular movement of the lever. The nut 47 is castellated, as indicated at 49, and a cotter pin 50 is passed through a hole in the valve stem and is arranged to occupy diametrically opposite notches in the nut.

The pressure-sustaining valves may be actuated more rapidly and more easily, and the wear and stress on their actuating mechanism is reduced, in consequence of omitting the usual closing springs.

Each cam 41 has two diametrically opposite concentric portions 41$^a$ and 41$^b$, a working portion 41$^c$, and a portion 41$^d$ which is the counterpart of 41$^c$. The portions 41$^a$ and 41$^b$ engage the two rolls 44 synchronously to hold the lever 42 positively in its two dwelling positions. The working portion 41$^c$ connects portions 41$^a$ and 41$^b$ and engages the rolls alternately to open and close the valve positively.

I claim:

1. An internal combustion engine comprising, in combination, a combustion chamber having an inlet-and-exhaust port, a pressure-sustaining puppet-valve arranged to coact with said port, non-elastic means arranged to open said valve positively at the beginning of the exhaust period and to close the same positively at the completion of the intake period, and means arranged to coöperate with said puppet-valve to control the gases passing to and from said chamber.

2. An internal combustion engine comprising, in combination, a combustion chamber having an inlet-and-exhaust port, a pressure-sustaining puppet-valve arranged to coact with said port, a single-face cam, means arranged to be reciprocated by said cam to open said valve positively at the beginning of the exhaust period and to close the same positively at the completion of the intake period, and means arranged to coöperate with said puppet-valve to control the gases passing to and from said chamber.

3. An internal combustion engine comprising, in combination, a combustion chamber having an inlet-and-exhaust port, a pressure-sustaining puppet-valve arranged to coact with said port, said valve having a stem, a rocker arranged to reciprocate said stem endwise, a single-face rotary cam arranged to act on said rocker to open said valve at the beginning of the exhaust period and to act again on said rocker to close the valve at the completion of the intake period, and means arranged to coöperate with said valve to control the gases passing to and from said chamber.

4. An internal combustion engine of the four-stroke-cycle type comprising, in combination, a combustion chamber, a piston therein, a valve including a casing and a rotary member therein, an intake-and-exhaust conduit extending from said valve to said chamber, said casing having an exhaust port and an intake port, said rotary member having a peripheral cavity arranged to connect said exhaust port and said intake port, alternately, with the mouth of said conduit, said cavity and said mouth being arranged to register with each other continuously through a period including substantial portions of the power stroke and compression stroke of said piston, and the intervening expulsion stroke and suction stroke, said exhaust port being arranged to register with said cavity during the power stroke and expulsion stroke, said intake port being arranged to register with said cavity during the suction stroke and compression stroke, a pressure-sustaining puppet-valve arranged to close said chamber with respect to said conduit, and means arranged to open said puppet-valve during said power stroke and close it during said compression stroke.

5. An internal combustion engine comprising in combination, a combustion chamber having a port, a pressure-sustaining puppet-valve arranged to control said port, said valve having a stem, a rigid lever of which one end is arranged adjacent said stem, a rigid coupling arranged to transmit motion positively in opposite directions without appreciable loss from said lever to said stem, and a single-face rotary cam arranged to oscillate said lever positively in opposite directions without appreciable loss.

6. An internal combustion engine comprising, in combination, a combustion chamber having a port, a pressure-sustaining puppet-valve arranged to control said port, said valve having a stem, a rigid lever of which one end is arranged adjacent said stem, a rotary cam arranged to act on said lever positively in opposite directions without appreciable loss, and a rigid coupling adjustably mounted on said stem and embracing said lever so as to transmit motion positively in opposite directions without appreciable loss, said coupling being capable of turning relatively to said lever about the axis of said stem.

7. In an internal combustion engine, the combination of a combustion cylinder, a puppet valve arranged to coact with said cylinder, a rotary cam, a pivoted rigid lever arranged to be oscillated positively and without lost motion in both directions by said cam, and a rigid connecting member arranged to provide a non-elastic swiveling connection between said puppet valve and said lever, said connecting member being adjustable to adjust said valve relatively to said lever.

8. In an internal combustion engine, the combination of a combustion cylinder, a puppet valve arranged to coact with said cylinder, a pivoted rigid lever having two forked arms, a rotary cam arranged to coact with one of said forked arms to oscillate said lever positively in both directions, and a rigid grooved collar rigidly mounted on said puppet valve, the other one of said forked arms being arranged in the groove of said collar to impart positive opening movement and positive closing movement to said valve.

9. In an internal combustion engine, the combination of a combustion cylinder having an intake-and-exhaust passageway, a rotary valve arranged to coact with said passageway to control the ingoing gases and the outgoing gases, means arranged to drive said rotary valve, a puppet valve arranged to coact with said cylinder and passageway, a cam mounted on said rotary valve, and non-elastic means connecting said cam and said puppet valve to transmit opening movement positively and closing movement positively to said puppet valve, to insure predetermined timed relation of said two valves at relatively high speeds.

In testimony whereof I have affixed my signature.

ROLLIN ABELL.